United States Patent
Rydgren

(10) Patent No.: US 8,170,794 B2
(45) Date of Patent: May 1, 2012

(54) NAVIGATION UNITS HAVING MULTIPLE OPERATION MODES FOR OUTPUTTING A CURRENT POSITION OR A STORED POSITION, RESPECTIVELY, AND METHODS AND COMPUTER PROGRAM PRODUCT FOR OPERATING THE SAME

(75) Inventor: Ake Nils Rydgren, Sodra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 102 days.

(21) Appl. No.: 12/193,344

(22) Filed: Aug. 18, 2008

(65) Prior Publication Data

US 2010/0042321 A1    Feb. 18, 2010

(51) Int. Cl.
*G01C 21/34* (2006.01)
(52) U.S. Cl. ...................................... 701/418
(58) Field of Classification Search ............... 701/200, 701/207, 211, 213, 400, 412, 418, 419, 425, 701/430, 454, 538, 540, 541; 340/988, 995.18, 340/426.19; 342/357.06, 357.12–357.13
See application file for complete search history.

(56) References Cited

U.S. PATENT DOCUMENTS

| | | | |
|---|---|---|---|
| 6,253,151 B1 | 6/2001 | Ohler et al. | |
| 6,768,450 B1 | 7/2004 | Walters et al. | |
| 2003/0073447 A1* | 4/2003 | Ogaki et al. | 455/456 |
| 2004/0249568 A1* | 12/2004 | Endo et al. | 701/209 |
| 2007/0126628 A1* | 6/2007 | Lalik et al. | 342/357.13 |
| 2007/0146199 A1 | 6/2007 | Huang et al. | |

FOREIGN PATENT DOCUMENTS

GB    2 370 708 A    7/2002

OTHER PUBLICATIONS

International Search Report and Written Opinion, PCT Application No. PCT/IB2009/050684, Feb. 19, 2009.

Celine Chen: "BT-Q1000 Travel Recorder®" Super 51-CH Performance Bluetooth GPS Travel Recorder—Super Track Logger and Navigation Dual-In-One; Qstarz™ User Manual; Oct. 25, 2007; Retrieved from the Internet: URL: http//www.qstarz.com/download/BT-Q1000%20User%20Manual-V2.pdf [retrieved on Nov. 5, 2010; 45 pages.

Notification of Transmittal and International Preliminary Report on Patentability dated Jul. 12, 2010; corresponding to International Application No. PCT/IB2009/050684; 11 pages.

* cited by examiner

*Primary Examiner* — Kim T Nguyen
(74) *Attorney, Agent, or Firm* — Myers, Bigel, Sibley & Sajovec, P.A.

(57) ABSTRACT

A navigation unit includes a position mode module that is operable to place the navigation unit in a first mode in which the navigation unit provides for output a current position of the navigation unit or a second mode in which the navigation unit provides for output at least one stored position.

17 Claims, 4 Drawing Sheets

NAVIGATION UNITS HAVING MULTIPLE OPERATION MODES FOR OUTPUTTING A CURRENT POSITION OR A STORED POSITION, RESPECTIVELY, AND METHODS AND COMPUTER PROGRAM PRODUCT FOR OPERATING THE SAME

BACKGROUND OF THE INVENTION

The present invention relates to navigation units and methods of operating the same and, more particularly, to outputting a particular position from a navigation unit.

The Global Positioning System (GPS) is a space-based radio triangulation system using a constellation of satellites in orbit around the earth. A GPS receiver triangulates its position based on timing of radio signals it receives from various ones of the satellites and the known location of those satellites.

Determining the position of a GPS receiver typically requires the acquisition of a set of navigational parameters from the navigational data signals of four or more GPS satellites. In some cases, the GPS receiver may not be integrated with a navigation application. This may present difficulties if a user desires to store a particular position for later retrieval. For example, many conventional GPS receivers are compatible with standard navigation applications that run on a mobile phone, Personal Digital Assistant (PDA), Personal Computer (PC) or the like. Conventional GPS receivers, however, do not provide a way to store a location for later retrieval. Instead, the navigation application is launched on another device and the user interface associated with the navigation application is used to retrieve a current position output from the GPS receiver for storage. Unfortunately, the navigation application may not be running at the time a user determines he/she would like to store a location. If the user is traveling in a vehicle at a relatively rapid rate of speed, then by the time the navigation application is launched and the current position of the GPS receiver is retrieved, the desired location may be an unacceptable distance away.

SUMMARY OF THE INVENTION

According to some embodiments of the present invention, a navigation unit includes a position mode module that is operable to place the navigation unit in a first mode in which the navigation unit provides for output a current position of the navigation unit or a second mode in which the navigation unit provides for output at least one stored position.

In other embodiments, the position mode module is operable to place the navigation unit in the first mode or the second mode responsive to input from a user.

In still other embodiments, a user interface module is configured to store the at least one stored position for subsequent retrieval responsive to input from the user.

In still other embodiments, the user interface module is further configured to provide audio, visual, and/or textual feedback to the user responsive to storing each of the at least one stored position.

In still other embodiments, the user interface module is configured to display the at least one stored position to the user, receive a selection of one of the at least one stored position from the user, and provide the selected one of the at least one stored position for output when the navigation unit is placed in the second mode.

In still other embodiments, each of the at least one stored position comprises a time, date, altitude, and/or speed associated therewith.

In still other embodiments, the at least one stored position includes a path traveled by the navigation unit over a time interval.

In still other embodiments, the navigation unit is a Global Positioning System (GPS) unit.

In further embodiments of the present invention, a navigation unit is operated by placing the navigation unit in a first mode in which the navigation unit provides for output a current position of the navigation unit and placing the navigation unit in a second mode in which the navigation unit provides for output at least one stored position.

In still further embodiments, placing the navigation unit in the first mode includes placing the navigation unit in the first mode responsive to input from a user and placing the navigation in the second mode includes placing the navigation unit in the second mode responsive to input from the user.

In still further embodiments, the method further includes storing the at least one stored position for subsequent retrieval responsive to input from the user.

In still further embodiments, the method further includes providing audio, visual, and/or textual feedback to the user responsive to storing each of the at least one stored position.

In still further embodiments, the method further includes displaying the at least one stored position to the user, receiving a selection of one of the at least one stored position from the user and providing the selected one of the at least one stored position for output when the navigation unit is placed in the second mode.

In still further embodiments, each of the at least one stored position comprises a time, date, altitude, and/or speed associated therewith.

In still further embodiments, the at least one stored position includes a path traveled by the navigation unit over a time interval.

In still further embodiments, the navigation unit is a Global Positioning System (GPS) unit.

In other embodiments of the present invention, a computer program product for operating a navigation unit includes a computer readable storage medium having computer readable program code embodied therein, the computer readable program code includes computer readable program code configured to place the navigation unit in a first mode in which the navigation unit provides for output a current position of the navigation unit and computer readable program code configured to place the navigation unit in a second mode in which the navigation unit provides for output at least one stored position.

In still other embodiments, the computer readable program code configured to place the navigation unit in the first mode comprises includes computer readable program code configured to place the navigation unit in the first mode responsive to input from a user and the computer readable program code configured to place the navigation in the second mode includes computer readable program code configured to place the navigation unit in the second mode responsive to input from the user.

In still other embodiments, the computer program product further includes computer readable program code configured to store the at least one stored position for subsequent retrieval responsive to input from the user.

In still other embodiments, the computer program product further includes computer readable program code configured to display the at least one stored position to the user, computer readable program code configured to receive a selection of one of the at least one stored position from the user, and computer readable program code configured to provide the selected one of the at least one stored position for output when the navigation unit is placed in the second mode.

Other electronic devices, methods, and/or computer program products according to embodiments of the invention will be or become apparent to one with skill in the art upon review of the following drawings and detailed description. It is intended that all such additional electronic devices, methods, and computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
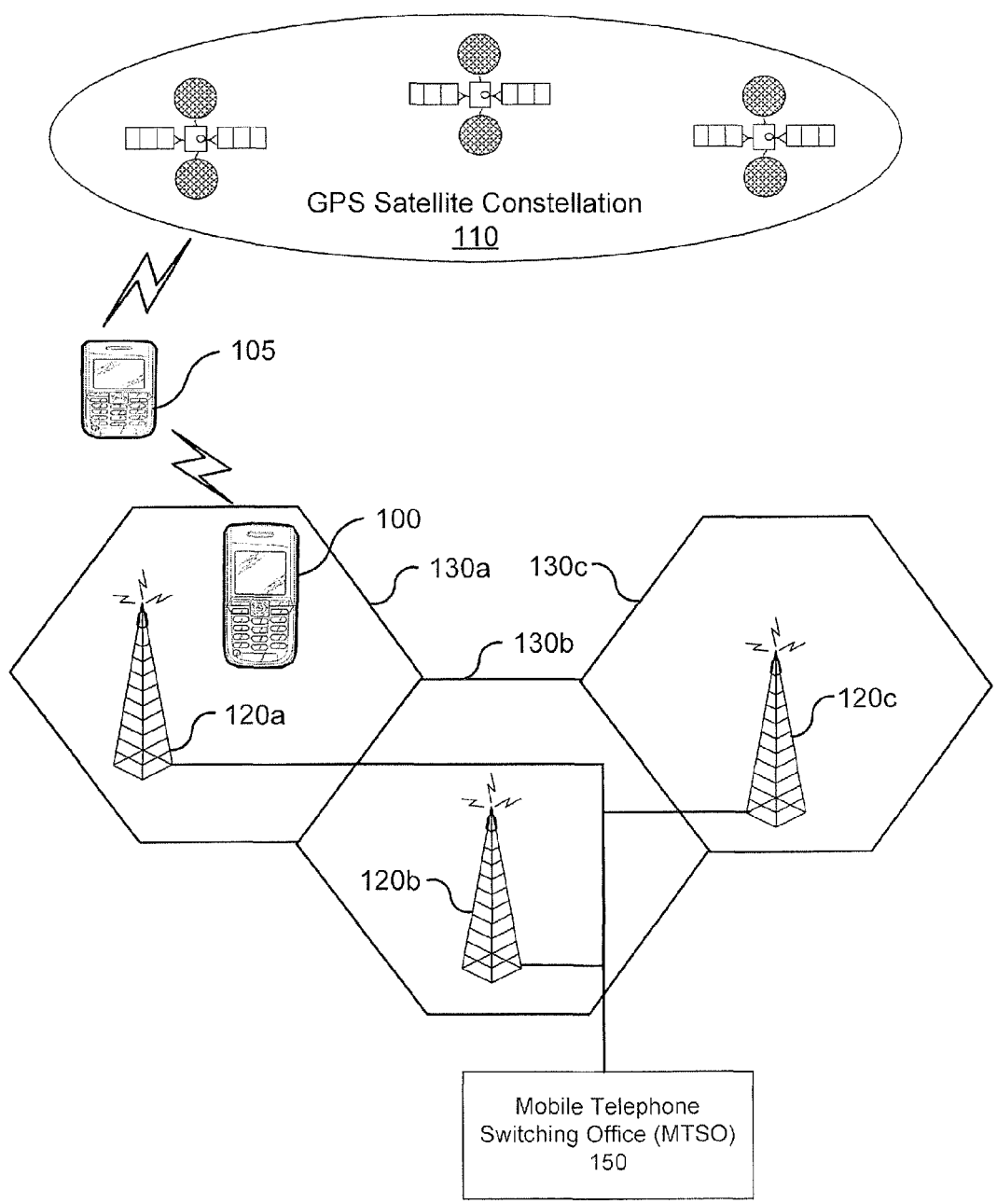
FIG. 1 is a block diagram of a terrestrial and satellite communication system that includes an exemplary multi-mode navigation unit in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

While various embodiments of the invention are described herein with reference to GPS satellites, it will be appreciated that they are applicable to any navigation system including, but not limited to, positioning systems that utilize pseudolites or a combination of satellites and pseudolites. Pseudolites are ground-based transmitters that broadcast a signal similar to a traditional satellite-sourced GPS signal modulated on an L-band carrier signal, generally synchronized with GPS time. The term "satellite", as used herein, is intended to include pseudolites or equivalents of pseudolites, and the term GPS signals, as used herein, is intended to include GPS-like signals from pseudolites or equivalents of pseudolites. Also, while the following discussion references the United States GPS system, various embodiments herein can be applicable to similar satellite positioning systems, such as the GLONASS system or GALILEO system. The term "GPS", as used herein, includes such alternative satellite positioning systems, including the GLONASS system and the GALILEO system. Thus, the term "GPS signals" can include signals from such alternative satellite positioning systems.

Figure 2:
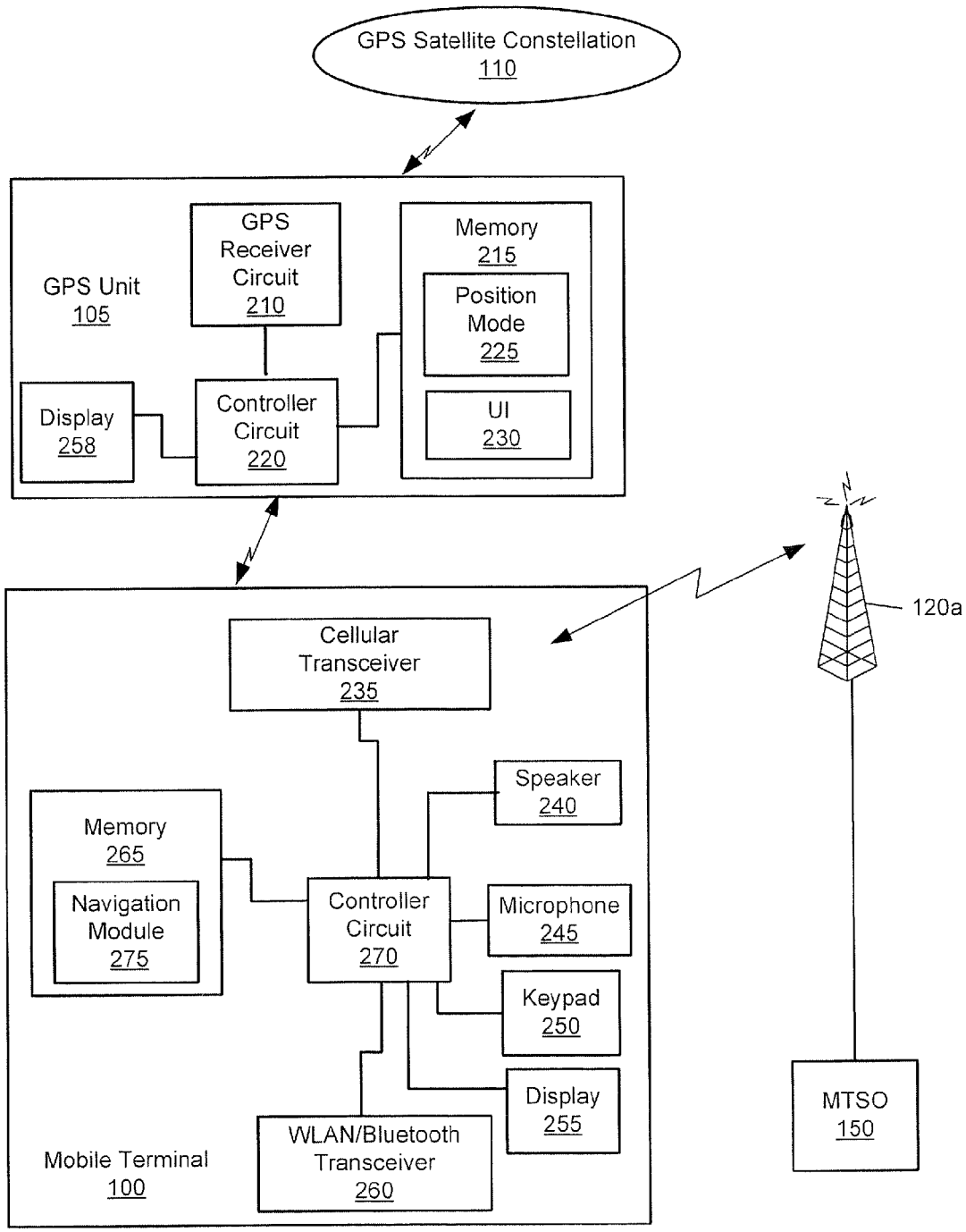
FIG. 2 is a block diagram that illustrates the multi-mode navigation unit of FIG. 1 in accordance with some embodiments of the present invention.

FIG. 1 is a schematic block diagram of a terrestrial and satellite communication system that includes a navigation unit 105 with a GPS receiver circuit. FIG. 2 is a schematic block diagram that illustrates further aspects of the navigation unit 105 and mobile terminal 100 shown in FIG. 1.

Referring to FIG. 1, the navigation unit 105 includes a GPS receiver circuit that determines geographic location of the navigation unit 105 using GPS radio signals that are received from a constellation of GPS satellites 110. The navigation unit 105 may communicate with another device, such as a mobile terminal 100 on which a navigation application may execute. The mobile terminal 100 can include a cellular transceiver that can communicate with a plurality of cellular base stations 120a-c, each of which provides cellular communications within their respective cells 130a-c. Each of the cellular base stations 120a-c may communicate with a Mobile Telephone Switching Office (MTSO) 150.

Although FIG. 1 illustrates an exemplary communication network, it will be understood that the present invention is not limited to such configurations, but is intended to encompass any configuration capable of carrying out the operations described herein.

Referring now to FIG. 2, the navigation unit 105 and the mobile terminal 100 shown in FIG. 1 are illustrated in greater detail in accordance with some embodiments of the present invention. The GPS navigation unit 105 includes a display 205, a GPS receiver circuit 210, and a memory 215 that communicate with a controller circuit 220. The GPS receiver circuit 210 receives GPS radio signals from visible satellites and measures the time that the radio signals take to travel from the respective GPS satellites to the GPS navigation unit 105. By multiplying the travel time by the propagation speed, the GPS receiver circuit 210 calculates a range for each satellite in view. Ephemeris information provided in the GPS radio signal describes the satellite's orbit and velocity, thereby enabling the GPS receiver circuit 210 to calculate the position of the GPS navigation unit 105 through a process of triangulation The controller circuit 220 communicates with the memory 215 via an address/data bus. The controller circuit 220 may be, for example, a commercially available or custom microprocessor. The memory 215 is representative of the one or more memory devices containing the software and data used to operate the GPS navigation unit 105. The memory 215 may include, but is not limited to the following types of devices: cache, ROM, PROM, EPROM, EEPROM, flash, SRAM, and DRAM.

As shown in FIG. 2, the memory 215 may contain up to two or more categories of software and/or data: a position mode module 225 and a user interface module 230. The position mode module 225 may be configured to place the GPS navigation unit 105 in at least two modes. In the first mode, the GPS navigation unit 105 outputs a current position of the unit. In the second mode, the GPS navigation unit 105 outputs one or more previously stored positions. The user interface module 230 may be configured to allow a user to select which mode the GPS navigation unit 105 operates in. The user interface module 230 may also be configured to allow a user to store one or more positions for subsequent retrieval. When a user would like to retrieve previously stored position, the user interface may present the stored locations on the display 205 where one or more locations may be selected for communication to a navigation application running on another device, for example.

The mobile terminal 100 includes a cellular transceiver 235, a speaker 240, a microphone 245, a keypad 250, a display 255, a WLAN/Bluetooth transceiver 260, and a memory 265 that communicate with a controller circuit 270. The cellular transceiver 235 can be configured to encode/decode and control communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The foregoing components of the mobile terminal 100 may be included in many conventional mobile terminals and their functionality is generally known to those skilled in the art.

The controller circuit 270 communicates with the memory 265 via an address/data bus. The controller circuit 270 may be, for example, a commercially available or custom microprocessor. The memory 265 is representative of the one or more memory devices containing the software and data used to operate the mobile terminal 100, in accordance with some embodiments of the present invention. The memory 265 may include, but is not limited to, the following types of devices: cache, ROM, PROM, EPROM, EEPROM, flash, SRAM, and DRAM.

As shown in FIG. 2, the memory 265 may contain a navigation module 270. The navigation module 270 may include a navigation application that is configured to receive position data from the GPS navigation unit 105. In accordance with various embodiments of the present invention, the position data may correspond to the current position of the GPS navigation unit 105 and/or may be one or more positions that have been previously stored in the GPS navigation unit 105 as discussed above. Once received at the mobile terminal 100, the navigation module 275 may process the positions in various ways including, but not limited to, using them as favorites, waypoints, and the like.

Although FIG. 2 illustrates an exemplary software and hardware architecture that may be used to provide the GPS navigation unit 105 and mobile terminal 100 as shown in FIG. 1, it will be understood that the present invention is not limited to such a configuration, but is intended to encompass any configuration capable of carrying out the operations described herein.

Computer program code for carrying out operations of devices and/or systems discussed above with respect to FIGS. 1-2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to message flow, flowchart and/or block diagram illustrations of methods, mobile terminals, electronic devices, communication networks, and/or computer program products in accordance with some embodiments of the invention. These message flow, flowchart and/or block diagrams further illustrate exemplary operations of navigation units having multiple operating modes and methods and computer program products for operating the same. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Figure 3:
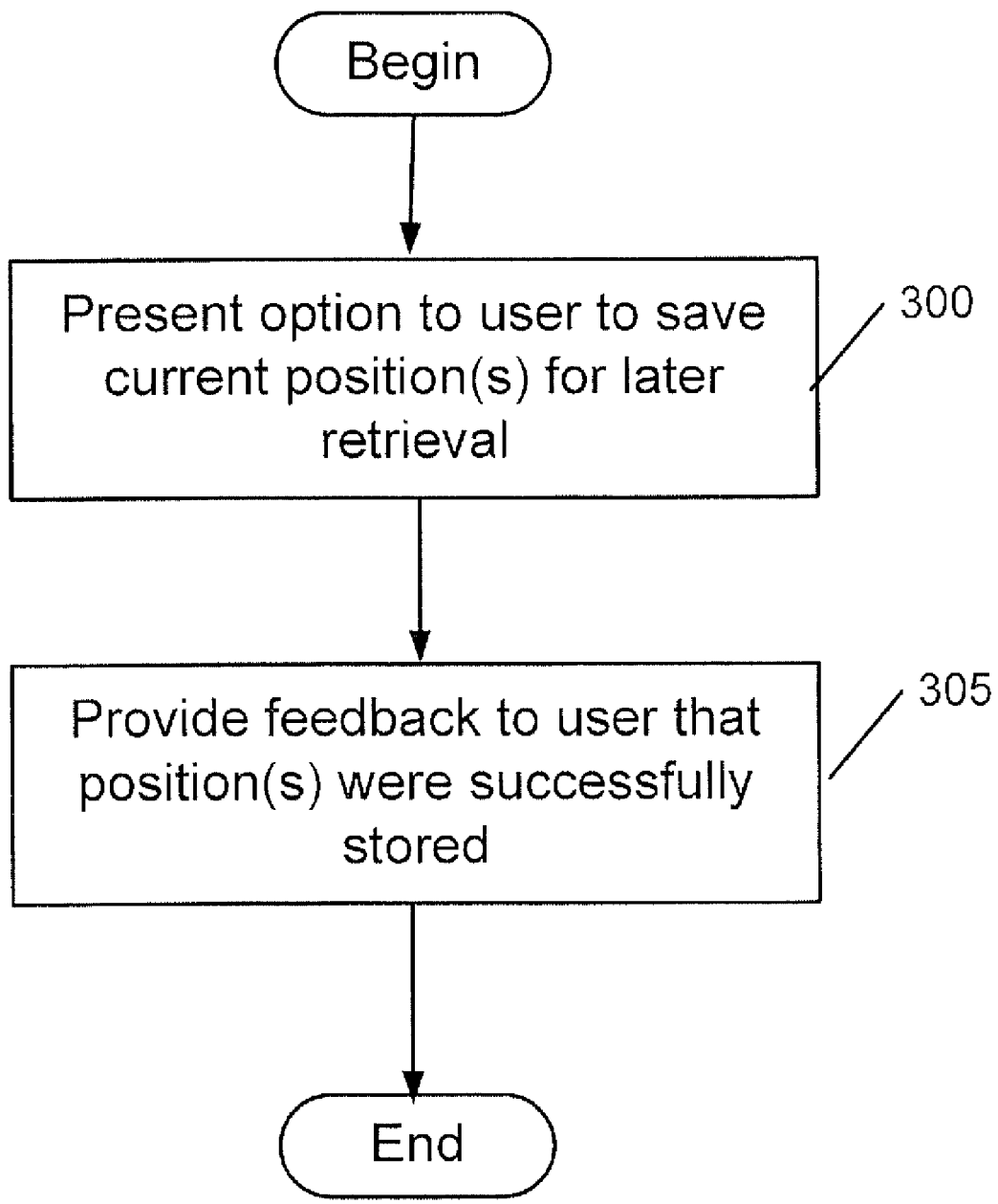
FIGS. 3 and 4 are flowcharts that illustrate operations of the multi-mode navigation unit and mobile terminal of FIGS. 1 and 2 in accordance with some embodiments of the present invention.
Figure 4:
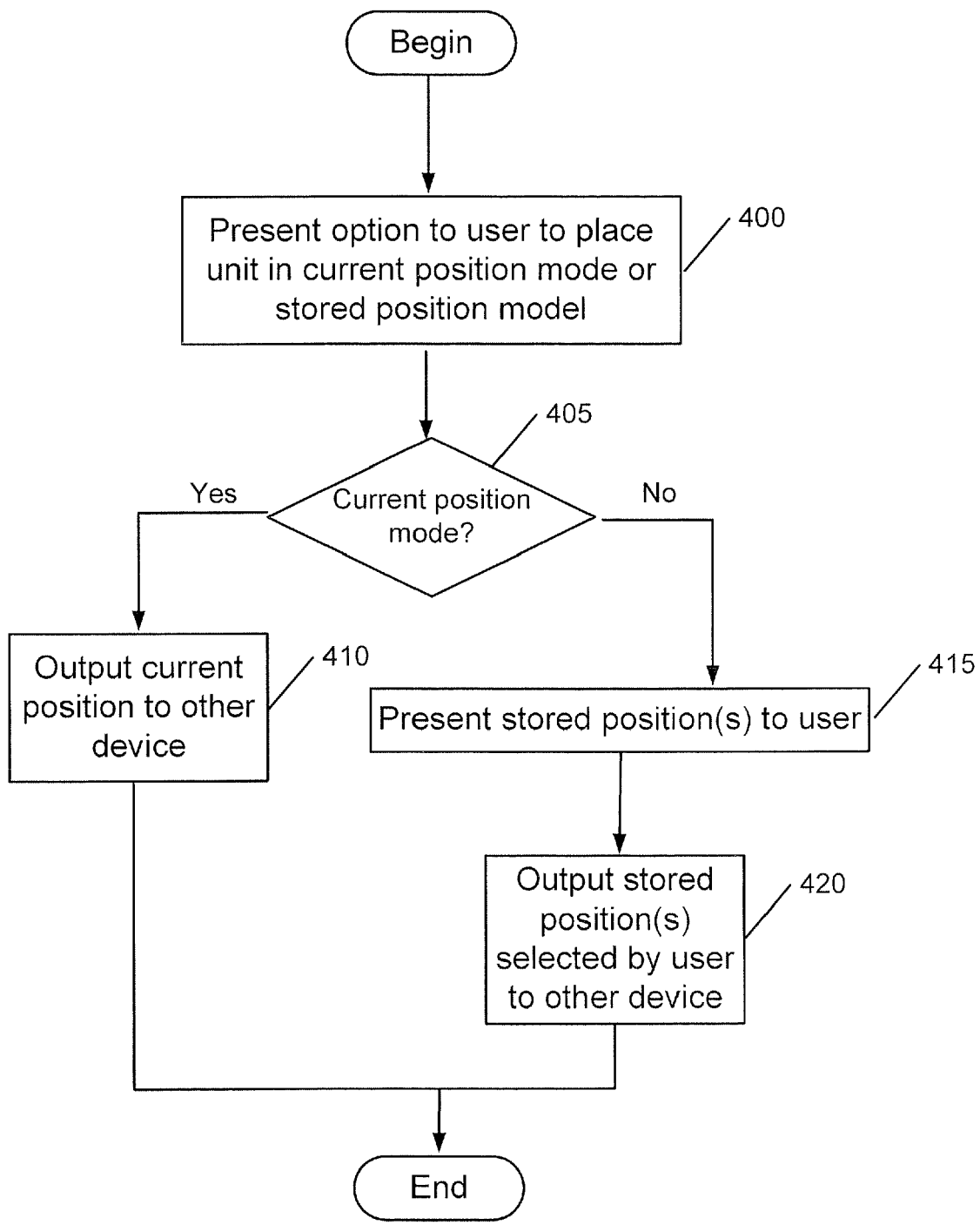

FIGS. 3 and 4 are flowcharts that illustrate operations of the GPS navigation unit 105 and mobile terminal 100 of FIGS. 1 and 2 in accordance with some embodiments of the present invention. Referring now to FIG. 3, operations begin at block 300 where the user interface module 230 of the GPS navigation unit 105 presents to the user the option to save one or more position(s) for later retrieval. In accordance with various embodiments of the present invention, each stored position may include such information as time, date, altitude, and/or speed associated therewith. In other embodiments, a position may not be a static position, but may comprise a path that the GPS navigation unit 105 has traveled over a time interval. At block 305, for each position that a user stores in the GPS navigation unit 105, the user interface module 230 provides some type of feedback to the user indicating that the storage was successful. This feedback may be, for example, audio, visual, and/or textual in accordance with various embodiments of the present invention.

Referring FIG. 4, operations for communicating stored positions from the GPS navigation unit 105 to another device that is running a navigation application, such as the mobile terminal 100 of FIGS. 1 and 2, in accordance with some embodiments of the present invention, will now be described. Operations begin at block 400 where the position mode module 225 of the GPS navigation unit 105 presents the option to the user of whether to place the GPS navigation unit 105 in a mode in which the current position is output from the unit or a mode in which one or more stored positions are output from the unit. If the user elects to place the GPS navigation unit 105 in a current position mode, then the current position of the GPS navigation unit 105 is output to the mobile terminal 100 at block 410. If, however, the user elects to place the GPS navigation unit 105 in a stored position mode, then the user interface module 230 presents the one or more stored positions to the user to allow the user to select which positions should be output to the mobile terminal 100 at block 415. At block 420, the GPS navigation unit 105 outputs the stored position(s) that are selected by the user to the mobile terminal 100. The navigation module 275 may process the current position and/or the stored position(s) that are received from the GPS navigation unit 105 in various ways including using the location(s) as waypoints, favorites, and the like.

Embodiments of the present invention may allow a navigation unit to be independent of the particular navigation application running on another device as the current position and stored position(s) look the same to the receiving navigation application. As a result, navigation units without a navigation application running thereon may have enhanced value.

The flowcharts of FIGS. 3 and 4 illustrate the architecture, functionality, and operations of embodiments of navigation units, methods, and/or computer program products for outputting a current position or one or more stored positions to another device. In this regard, each message represents a module, segment, or portion of code, which comprises one or more executable instructions for implementing the specified logical function(s). It should also be noted that in other implementations, the function(s) noted in the messages may occur out of the order noted in FIGS. 3 and 4. For example, two blocks shown in succession may, in fact, be executed substantially concurrently or the blocks may sometimes be executed in the reverse order, depending on the functionality involved.

In the drawings and specification, there have been disclosed embodiments of the invention and, although specific terms are employed, they are used in a generic and descriptive sense only and not for purposes of limitation, the scope of the invention being set forth in the following claims.

That which is claimed:

1. A navigation unit, comprising:
a controller circuit; and
a position mode module coupled to the controller circuit that is operable to place the navigation unit in a first mode in which the navigation unit provides for output to a navigation device other than the navigation unit a current position of the navigation unit or a second mode in which the navigation unit provides for output to the navigation device other than the navigation unit at least one stored position;
wherein the position mode module is operable to place the navigation unit in the first mode or the second mode responsive to direct input from a user.

2. The navigation unit of claim 1, further comprising:
a user interface module that is configured to store the at least one stored position for subsequent retrieval responsive to input from the user.

3. The navigation unit of claim 2, wherein the user interface module is further configured to provide audio, visual, and/or textual feedback to the user responsive to storing each of the at least one stored position.

4. The navigation unit of claim 2, wherein the user interface module is configured to display the at least one stored position to the user, receive a selection of one of the at least one stored position from the user, and provide the selected one of the at least one stored position for output to the navigation device other than the navigation unit when the navigation unit is placed in the second mode.

5. The navigation unit of claim 1, wherein each of the at least one stored position comprises at least one of a time, date, altitude, and speed associated therewith.

6. The navigation unit of claim 1, wherein the at least one stored position comprises a plurality of stored positions, which comprise a path traveled by the navigation unit over a time interval.

7. The navigation unit of claim 1, wherein the navigation unit is a Global Positioning System (GPS) unit.

8. A method of operating a navigation unit, comprising:
placing the navigation unit in a first mode in which the navigation unit provides for output to a navigation device other than the navigation unit a current position of the navigation unit; and
placing the navigation unit in a second mode in which the navigation unit provides for output to the navigation device other than the navigation unit at least one stored position;
wherein placing the navigation unit in the first mode comprises placing the navigation unit in the first mode responsive to direct input from a user; and
wherein placing the navigation in the second mode comprises placing the navigation unit in the second mode responsive to direct input from the user.

9. The method of claim 8, further comprising:
storing the at least one stored position for subsequent retrieval responsive to input from the user.

10. The method of claim 9, further comprising:
providing audio, visual, and/or textual feedback to the user responsive to storing each of the at least one stored position.

11. The method of claim 9, further comprising:
displaying the at least one stored position to the user;
receiving a selection of one of the at least one stored position from the user; and providing the selected one of the at least one stored position for output to the navigation device other than the navigation unit when the navigation unit is placed in the second mode.

12. The method of claim 8, wherein each of the at least one stored position comprises at least one of a time, date, altitude, and speed associated therewith.

13. The method of claim 8, wherein the at least one stored position comprises a plurality of stored positions, which comprise a path traveled by the navigation unit over a time interval.

14. The method of claim 8, wherein the navigation unit is a Global Positioning System (GPS) unit.

15. An article of manufacture for operating a navigation unit, comprising:
   a non-transitory computer readable storage medium having computer readable program code embodied therein, the computer readable program code comprising:
   computer readable program code configured to place the navigation unit in a first mode in which the navigation unit provides for output to a navigation device other than the navigation unit a current position of the navigation unit; and
   computer readable program code configured to place the navigation unit in a second mode in which the navigation unit provides for output to the navigation device other than the navigation unit at least one stored position;
   wherein the computer readable program code configured to place the navigation unit in the first mode comprises computer readable program code configured to place the navigation unit in the first mode responsive to direct input from a user; and
   wherein the computer readable program code configured to place the navigation in the second mode comprises computer readable program code configured to place the navigation unit in the second mode responsive to direct input from the user.

16. The article of manufacture of claim 15, further comprising:
   computer readable program code configured to store the at least one stored position for subsequent retrieval responsive to input from the user.

17. The article of manufacture of claim 15, further comprising:
   computer readable program code configured to display the at least one stored position to the user;
   computer readable program code configured to receive a selection of one of the at least one stored position from the user; and
   computer readable program code configured to provide the selected one of the at least one stored position for output to the navigation device other than the navigation unit when the navigation unit is placed in the second mode.

* * * * *